Patented Mar. 13, 1951

2,545,169

UNITED STATES PATENT OFFICE 2,545,169

PROCESS FOR TREATING WEIGHTED MUDS FOR VISCOSITY REDUCTION

Richard A. Salathiel, Houston, Tex., assignor, by mesne assignments, to Standard Oil Development Company, Elizabeth, N. J., a corporation of Delaware No Drawing. Application September 14, 1949, Serial No. 115,785

6 Claims. (Cl. 252—8.5)

This invention relates to well drilling fluids and more particularly to fluids comprising solids in suspension in a liquid such, for example, as are ordinarily employed in connection with the drilling operations of oil and gas wells through subsurface formations.

Aqueous suspension of finely divided solids are widely employed for the drilling of boreholes in subsurface formations. These suspensions are sometimes prepared by admixing a commercial clay with water. Heavy weighting materials, such as barytes, iron oxide, barium sulfate, etc., may be added to such a suspension in order to increase its specific gravity. In many cases, however, the drilling fluid for use in oil and gas wells is prepared on the site, that is, by admixing water with the cuttings produced from the borehole. Weighting materials may, of course, be added to a drilling fluid prepared in the last mentioned manner.

During the drilling of an oil and gas well, drilling mud is forced to circulate downwardly through the drill pipe, past the cutting bit, and upwardly through the annular space between the drill pipe and the borehole walls to the surface. After the mud has been allowed to return to the surface, cuttings, gas bubbles and other foreign matter are removed from the mud by various means such, for example, as settling, centrifuging, screening and the like. Following the removal of the aforementioned materials, the mud is again pumped into the drill pipe through which it is recirculated. The functions of the mud are many fold. One of the functions of the mud is to pick up the cuttings produced during drilling and transport them to the surface. Another function is to maintain the small cuttings in suspension in the borehole when the mud is not being circulated. In order to perform this function, the mud must have a certain minimum gel strength. On the other hand, the viscosity and gel strength cannot be permitted to rise too high because of the difficulty in effecting circulation and also because of the difficulty of removing entrained cuttings and gas bubbles. Further, the gel strength must be sufficiently great to retain the weighting material added thereto in suspension at all times.

Another function of the mud is the building up of a coating of low permeability on the borehole walls, thereby restricting the egress of fluid from the mud to the surrounding formations. The ability to form this substantially impervious coating is dependent on the colloidal character of the suspension.

Another important function of the drilling mud is to maintain pressure in the hole to prevent ingress of undesirable fluids into the drilling fluid and in extreme cases to prevent blowouts. Thus, the long column of drilling mud must be of sufficient weight to provide a hydrostatic pressure great enough to more than balance the pressure exerted by the fluids originating in the formations penetrated by the borehole.

Occasionally muds possessing all of the above mentioned desired characteristics are produced from the borehole cuttings. Ordinarily, however, muds normally employed are either specially prepared or the borehole cuttings are specially treated to impart to the mud the particular properties desired in the various stages of the drilling operation. Drilling muds made from the borehole cuttings are often insufficiently heavy to provide the necessary hydrostatic pressure to balance high fluid pressures encountered. It is common practice to add weighting materials, such as barytes, iron oxide, silica, barium sulfate, calcium carbonate, and the like, to the drilling mud in order to increase the density of the mud and thereby increase the hydrostatic pressure which it exerts. Where such materials are added, it is of particular importance that the colloidal components of the mud be in such quantity and condition as to insure suspension of these heavy particles and to prevent their settling out. For example, it often happens that as drilling progresses, the drilling fluid employed, whether prepared from materials on the site or from selected materials, picks up an excessive amount of colloidal material, thereby imparting to the mud undesirable properties such, for example, as excessive viscosity and gel properties. When this occurs, various agents, including water and suitable chemicals, are commonly employed to amend these properties so as to impart to the mud the desired characteristics. For instance, in the Gulf Coast region as water is added to the system to control viscosity and gel strength, more mud is made from the borehole than can be employed in the drilling operation and consequently mud must be discarded. Inasmuch as bottom hole pressures are often high in this region, added weighting materials are commonly present as a constituent of that portion of the drilling mud discarded. Since weighting materials are expensive, to discard drilling mud containing them is to increase costs of drilling. In order to maintain costs at a minimum, the amount of mud discarded is kept to a minimum with the result that viscosities of a high order of magnitude are tolerated even though maximum dosages of viscosity reducing agents, such as sodium hexametaphosphate or caustic-tannin mixtures, have been admixed with the mud. While in some regions more than sufficient clay material is produced from the borehole during drilling, in other regions, such as in certain areas of west Texas, practically no clay material is produced from the borehole. Where this condition prevails, clay must be added from an outside source in order to impart the desired colloidal characteristics to the drilling fluid. Weighting materials are also normally added for increasing the density of the mud. The properties of muds prepared in this manner are often controlled by the introduction of amendatory agents.

Among the viscosity reducing chemicals, the polyphosphate compounds, such as sodium hexametaphosphate, tetra sodium pyrophosphate, and sodium acid pyrophosphate, have usually been regarded as the most desirable, if not absolutely necessary, for the treatment of heavily weighted drilling muds, such, for example, as 14 pounds per gallon or heavier muds, to a desirably low viscosity economically. In many instances, however, when a sufficient quantity of a chemical of this kind is added to reduce the viscosity of the mud to the desired level, the gel strength of the mud is thereby reduced to undesirably low values. When this last mentioned condition exists, the mud will not maintain the weighting materials suspended therein. Settling of the weighting materials will, of course, reduce the unit weight of the mud, thereby impairing its value in maintaining the desired hydrostatic pressure as well as causing other difficulties.

It is one object of this invention to provide ingredients for heavily weighted drilling muds having suitable physical and chemical characteristics for producing the desired colloidal properties in such muds. It is a further object of this invention to provide ingredients for drilling muds which will safely impart the desired viscosity and gel strength characteristics to heavily weighted drilling mud and to provide a process for the preparation of drilling muds containing these ingredients. It is a further object of this invention to provide a process for treating drilling muds so as to maintain a low viscosity and at the same time a satisfactory gel strength in the mud.

I have discovered that in reducing the viscosity of a drilling mud, the polyphosphate viscosity reducers and the caustic-tannin viscosity reducers effect both the colloidal clay component and the weighting agents and other coarse components. For example, sodium hexametaphosphate reduces the viscosity of the clay component of the mud as well as the component consisting of weighting agent and coarse materials. I have further found that in order to reduce the viscosity of the drilling mud to the desired level, it is often necessary to add relatively large quantities of such agents to the mud and that when such quantities are added, not only is the viscosity reduced, but the gel strength may also be reduced to undesirably low levels.

I have discovered certain chemicals which, rather than effecting both the clay component of the mud and the heavy component of the mud, exert a major effect on the weighting agents and other coarse components of the mud while exerting a minor effect, or no effect at all, on the clay component of the mud. Thus, with these latter mentioned chemicals the weighting agent and other coarse components of the mud may be selectively treated to reduce the viscosity of the mud while at the same time the gel strength of the mud is not reduced below a desired level. Since these chemicals selectively treat the coarser and more dense components of the mud while having little or no effect on the colloidal clay components, the viscosity and gel characteristics of the mud due to the clay component are altered little, if any. Consequently, the viscosity and gel strength of the mud due to this unaltered colloidal clay component may be independently adjusted to a desired value by controlling the clay content of the drilling mud. Ordinarily the clay content should be so regulated that the extrapolated yield value of the mud will not be greatly in excess of that required to maintain the weighting agent suspended, so that separation of gas bubbles, sand, and cuttings is most readily effected.

Briefly, the process involved in my invention comprises incorporating in a heavily weighted drilling mud a chemical which treats the weighting agent and other coarse components selectively to reduce the viscosity of the drilling mud and adjusting the clay content of the mud to give the mud the desired viscosity and gel strength characteristics. Of course, the clay content may be adjusted upwardly or downwardly, depending on whether more or less clay is needed in the mud to impart the desired properties thereto. Where more clay components are produced from the borehole during drilling than can be tolerated, the excess clay components may be separated from the mud by any well known means as, for example, by centrifuging. All or only a portion of the mud may be centrifuged, either continuously or intermittently, adjusting the centrifuge so that the desired amount of clay is removed from the mud. The clay suspension discarded from the mud may be replaced by an equivalent amount of water, if desired. When not enough clay is produced from the borehole during drilling to provide a satisfactory drilling mud, a mud having the desired viscosity, extrapolated yield value, and other properties may be initially prepared by admixing clay, such as bentonite, with a weighting material and water. By carefully controlling the amount of clay initially introduced, the mud need not be centrifuged during the drilling operation so long as no clay is produced. If clay is produced, the mud, if conditions require, should be centrifuged as hereinbefore described. By employing the process of my invention, the yield value of the heavily weighted mud due to the clay component may be maintained at a value sufficient to prevent settling of the weighting agent from the mud, while at the same time the viscosity of the mud may be maintained at a desirably low value. Removal of clay from the heavily weighted mud followed by treatment of the mud with a selective chemical will reduce the viscosity of the weighted mud more than it would have been reduced by merely adding a polyphosphate type mud viscosity reducer to reduce the yield value of the weighted mud to an equal extent.

If minimum viscosity is to be obtained in the heavily weighted mud, the amount of clay present should be as small as possible. At the same time the gel characteristics caused by the clay must necessarily be of sufficient magnitude to prevent settling out of the weighting agent. In this connection an extrapolated yield value of about 12 to 15 grams measured on a Stormer viscosimeter, may be regarded as a desirable range which will prevent settling of the barytes type weighting agent from drilling mud while still permitting 60 to 100 mesh sand to settle readily from the mud during moderate agitation in the mud ditch or pits. It will be understood, of course, that when weighting materials of larger particle size or of greater specific gravity than the usual barytes type weighting agent is incorporated in a drilling mud, it may be necessary to maintain an extrapolated yield value greater than 15 grams, and the particular minimum value to be maintained may be determined by experimentation for each particular type of weighting agent employed.

As pointed out above, addition of a chemical which will decrease as much as possible that part of the viscosity in the weighted mud due to the weighting agent and other coarse particles is desired. This chemical should not, however, appreciably reduce that part of the yield value in the mud due to the clay component for if the yield value due to the clay component is reduced below the desired value, more clay must necessarily be added to the mud to raise the yield value to the desired level. This last mentioned expedient is undesirable since addition of clay increases the viscosity of the mud and it is desirable to keep this viscosity low. It will be appreciated that chemicals which decrease appreciably the viscosity and gel properties due to the clay component as well as these properties due to the weighting agent should not ordinarily be employed; sodium hexametaphosphate is in this class of chemicals.

Chemicals well adapted for selectively treating the heavy components of drilling muds may be characterized as the alkali metal salts of carboxylated benzene or substituted alkyl benzene, in which the benzene or substituted benzene nuclei contains at least three carbon atoms to which carboxyl groups are attached and may have as many as six carbon atoms to which carboxyl groups are attached. Graphical formulas of these compounds are indicated below and the common name of the compound wherein both R and X are hydrogen atoms is given.

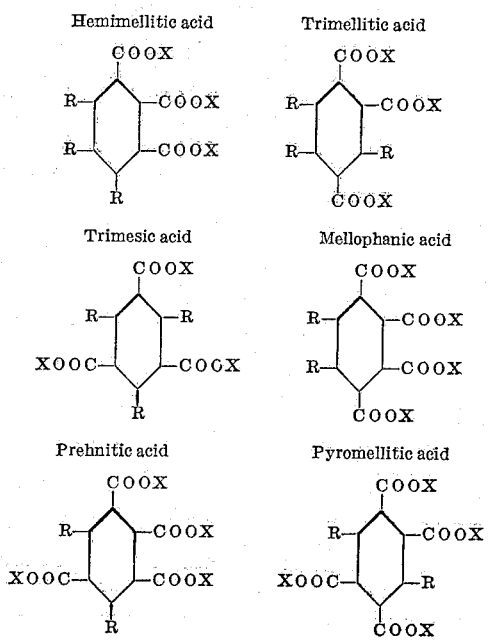

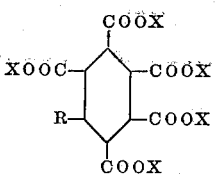

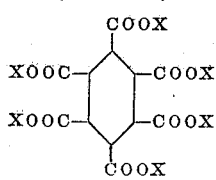

In the above formulas C signifies a carbon atom, O an oxygen atom, X an alkali metal atom, and R a hydrogen atom or an alkyl group. It will be understood that any one of the above designated compounds may be employed or a mixture of two or more may be employed with equal effect. Furthermore, these compounds need not be in pure form and commercial products containing substantial quantities of any one or more of these compounds may be employed. As a matter of fact, I have found that alkali metal salts of acids of the afore-described character secured by the oxidation of coal in the presence of aqueous alkali provide excellent results. A detailed description of the process employed in the manufacture of the aforementioned product may be found in an article entitled "Organic Acids by Direct Oxidation of Coal" appearing in Chemical Industries, pages 580 to 581, April 1946. In carrying out my invention, the alkali metal salts of carboxylated benzene or substituted alkyl benzene may, of course, be introduced as such into the drilling mud to be treated or they may be first dissolved in an appropriate solvent, such as water, and introduced into the mud in the form of a solution. Irrespective of the manner in which introduced, a sufficient quantity of these salts should be added to provide a concentration of from 0.001 weight per cent to 1.0 weight per cent in the treated mud. Ordinarily an amount in the range of 0.001 weight per cent to 0.2 weight per cent will be found sufficient.

The following examples will illustrate the effectiveness of my invention in the treatment of heavily weighted drilling muds. Inasmuch as Wyoming bentonite clay is a very highly colloidal clay widely used in the preparation of muds for use in the drilling of oil and gas wells, a series of tests were made to determine the effect of adding different quantities of alkali metal salts of aromatic acids from the oxidation of bituminous coal on the viscosity of a Wyoming bentonite mud as compared to the effects of a well known viscosity reducing agent, such as sodium hexametaphosphate, on the viscosity of this same mud. In making this series of tests successively larger amounts of the sodium salts of aromatic acids from the oxidation of bituminous coal were mixed with samples of the mud and the centipoise viscosity at 600 R. P. M. Stormer determined for each sample. Similar amounts of sodium hexametaphosphate were added to other samples of the mud and the viscosity of these samples was also determined. Water was added to another series of mud samples in the same amounts in which the chemical and the sodium hexametaphosphate were added to the above-referred-to samples. From the various viscosity values obtained, a value denominated "per cent viscosity reduction by chemical factor" was calculated in accordance with the following formula:

Per cent viscosity reduction by chemical factor=
$$\frac{\text{viscosity at equivalent dilution}-\text{observed viscosity}}{\text{viscosity at equivalent dilution}} \times 100$$

Of course, the above formula assumes that the change in viscosity attributable to the chemical added is equal to the viscosity after dilution to an equivalent extent with water less the observed viscosity of the mud treated with the chemical solution. The results obtained in the aforementioned series of tests are shown below in the following table:

TABLE I

| Chemical Added | Per Cent of Chemical Added | | | | | | |
|---|---|---|---|---|---|---|---|
| | 0.005 | 0.010 | 0.020 | 0.040 | 0.080 | 0.160 | 0.320 |
| | Per Cent Viscosity Reduction by Chemical Factor | | | | | | |
| Sodium Hexametaphosphate | 22.5 | 26.5 | 24.5 | 25.7 | 30.1 | 32.6 | |
| Sodium Salts of Mixed Aromatic Acids | 0 | 0 | 0 | 0 | 0.8 | 1.8 | 3.0 |

It will be noted that whereas sodium hexametaphosphate reduces appreciably the viscosity of the bentonite mud, the sodium salts of mixed aromatic acids had very little effect on the voscosity of this mud even at the higher concentrations employed.

In another series of tests the effect of sodium salts of mixed aromatic acids from the oxidation of bituminous coal on the viscosity of aqueous suspensions of barytes weighting agent was determined. Due to the rapid settling rate of the weighting agent solids in dilute suspensions, the tests could not be made in exactly the same way as were the tests in which bentonite clay was used. It was found, however, that by using very thick paste-like aqueous suspensions of the barytes weighting agent and testing at very much lower rates of shear immediately after vigorous mixing that tests of satisfactory precision could be made. Consequently, barytes weighting agent pastes containing about 16.7% by weight of water and 83.3% by weight of a commercial barytes weighting agent were employed. To different samples of this paste various quantities of sodium salts of mixed aromatic acids were added. Comparable quantities of sodium hexametaphosphate were added to other samples of this paste for purposes of comparison. The viscosity of each sample was determined at 20 R. P. M. Stormer and the driving force for the untreated paste was about 500 grams. In order to determine the effect of dilution, water was added to various samples of the paste in amounts equivalent to that in which the chemical and the sodium hexametaphosphate were added to the aforementioned samples. The per cent viscosity reduction by chemical factor, again employing the formula hereinbefore discussed, was calculated for each sample containing sodium salts of mixed aromatic acids and sodium hexametaphosphate. These calculated values appear in the following table:

TABLE II

| Chemical Added | Per Cent of Chemical Added | | | |
|---|---|---|---|---|
| | 0.0139 | 0.0278 | 0.0555 | 0.111 |
| | Per Cent Viscosity Reduction by Chemical Factor | | | |
| Sodium Hexametaphosphate | 27.4 | 83.5 | 98.0 | |
| Sodium Salts of Mixed Aromatic Acids | 31.3 | 83.6 | 96.4 | 98.8 |

It will be observed from the above data that both sodium hexametaphosphate and sodium salts of mixed aromatic acids reduce the viscosity of the barytes containing paste to approximately the same extent.

Inasmuch as heavily weighted muds used in drilling actually contain both clay and weighting agent, another series of tests were made on a mud weighing approximately 17.4 pounds per gallon. This mud consisted of 1.75% by weight of a commercial Wyoming bentonite clay, 66.7% by weight of a commercial barytes weighting agent, and 31.55% by weight of water. To different samples of this mud various amounts of sodium salts of mixed aromatic acids were added. To another series of samples various amounts of sodium hexametaphosphate were added. In addition water was added to separate samples of the mud in amounts substantially equivalent to the amounts in which the aforementioned chemicals were added. Again the per cent viscosity reduction by chemical factor was calculated in accordance with the hereinbefore discussed formula. These calculated values appear in the following table:

TABLE III

| Chemical Added | Per Cent of Chemical Added | | | | | | |
|---|---|---|---|---|---|---|---|
| | 0.0017 | 0.0033 | 0.0067 | 0.0133 | 0.0267 | 0.0533 | 0.107 |
| | Per Cent Viscosity Reduction by Chemical Factor | | | | | | |
| Sodium Hexametaphosphate | 19.2 | 24.1 | 30.0 | 37.4 | 52.0 | 57.5 | 58.4 |
| Sodium Salts of Mixed Aromatic Acids | 8.2 | 16.6 | 23.5 | 32.5 | 36.7 | 41.8 | 43.5 |

The data contained in the above table show that the viscosity of the mud was materially reduced both by sodium hexametaphosphate and by sodium salts of mixed aromatic acids, although the former gave a somewhat greater viscosity reduction than did the latter. This difference, of course, would be expected inasmuch as Tables I and II show that sodium hexametaphosphate effectively reduces both the viscosity due to the weighting agent and the viscosity due to the clay component, whereas the sodium salts of mixed aromatic acids, although effective in reducing the viscosity of the barytes containing paste, had little or no effect on the viscosity of the mud containing only Wyoming bentonite. It will be obvious, therefore, that the reduction of the viscosity of the above described 17.4 pound mud by the sodium salts of mixed aromatic acids is attributable to the effectiveness of this material in reducing the viscosity of the heavy weighting agent.

Additional tests were made to determine the effect of sodium salts of mixed aromatic acids on heavily weighted muds containing different amounts of clay. In this series of tests three different muds were employed which differ from one another only in the amount of Wyoming bentonite and water present, the Wyoming bentonite present being 1.75%, 1.44%, and 1.25% respectively, the amount of water increasing correspondingly. Each mud contained 66.67% of a commercial barytes weighting agent. To different samples of each of these muds different amounts of sodium salts of mixed aromatic acids were added. Comparable quantities of sodium hexametaphosphate were added to other samples while comparable amounts of water were added to still other samples. The viscosity in centipoises at 600 R. P. M. Stormer and the extrapolated yield value in grams Stormer of each sample were determined. These viscosities and yield values are shown in Tables IV and V, respectively.

so low that the barytes weighting agent settled out of the fluid. When .0533% or more of sodium hexametaphosphate was added to the mud, the extrapolated yield value of the mud was zero.

TABLE IV

Effect of chemical treatment on viscosity of Wyoming bentonite-barytes muds

| Approximate Composition of Mud | Chemical Added | Weight Per Cent (Based on Mud) of Chemical Added | | | | | | | |
|---|---|---|---|---|---|---|---|---|---|
| | | 0.000 | 0.0017 | 0.0033 | 0.0067 | 0.0133 | 0.0267 | 0.0533 | 0.1067 |
| | | Viscosity at 600 R. P. M. Stormer: Centipoises | | | | | | | |
| 1.75% Wyoming Bentonite, 31.58% Water, 66.67% Barytes. | Sodium Hexametaphosphate | 229 | 185 | 173 | 159 | 141 | 106 | 91 | [1]83 |
| | Sodium Salts of Mixed Aromatic Acids. | 229 | 210 | 190 | 174 | 152 | 140 | 124 | 113 |
| | Dilution to Equal Extent with Water. | 229 | 229 | 228 | 227 | 225 | 221 | 213 | 200 |
| 1.44% Wyoming Bentonite, 31.89% Water, 66.67% Barytes. | Sodium Hexametaphosphate | 126 | 105 | 99 | 84 | 73 | [1]58 | [1]55 | [1]53 |
| | Sodium Salts of Mixed Aromatic Acids. | 126 | 109 | 99 | 92 | 87 | 79 | 73 | 66 |
| | Dilution to Equal Extent with Water. | 126 | 126 | 126 | 125 | 124 | 122 | 119 | 111 |
| 1.25% Wyoming Bentonite, 32.08% Water, 66.67% Barytes. | Sodium Hexametaphosphate | 96 | 83 | 75 | 66 | 54 | [1]44 | [1]42 | [1]40 |
| | Sodium Salts of Mixed Aromatic Acids. | 96 | 83 | 75 | 70 | 65 | 59 | 53 | 48 |
| | Dilution to Equal Extent with Water. | 96 | 96 | 96 | 95 | 95 | 94 | 92 | 88 |

[1] Settling out of weighting agent during testing was observed.

TABLE V

Effect of chemical treatment on gel strength of Wyoming bentonite-barytes muds

| Approximate Composition of Mud | Chemical Added | Weight Per Cent (Based on Mud) of Chemical Added | | | | | | | |
|---|---|---|---|---|---|---|---|---|---|
| | | 0.000 | 0.0017 | 0.0033 | 0.0067 | 0.0133 | 0.0267 | 0.0533 | 0.1067 |
| | | Extrapolated Yield Value: Grams Stormer | | | | | | | |
| 1.75% Wyoming Bentonite, 31.58% 66.67% Barytes. | Sodium Hexametaphosphate | 310 | 220 | 196 | 145 | 96 | 39 | 19 | [1]5 |
| | Sodium Salts of Mixed Aromatic Acids. | 310 | 261 | 230 | 200 | 170 | 132 | 101 | 83 |
| | Dilution to Equal Extent with Water. | 310 | 309 | 308 | 305 | 300 | 292 | 273 | 255 |
| 1.44% Wyoming Bentonite, 31.89% Water, 66.67% Barytes. | Sodium Hexametaphosphate | 150 | 97 | 81 | 59 | 38 | [1]8 | [1]2 | [1]1 |
| | Sodium Salts of Mixed Aromatic Acids. | 150 | 120 | 100 | 90 | 74 | 57 | 48 | 38 |
| | Dilution to Equal Extent with Water. | 150 | 150 | 149 | 147 | 145 | 141 | 133 | 123 |
| 1.25% Wyoming Bentonite, 32.08% Water, 66.67% Barytes. | Sodium Hexametaphosphate | 110 | 74 | 62 | 44 | 21 | [1]4 | [1]0 | [1]0 |
| | Sodium Salts of Mixed Aromatic Acids. | 110 | 83 | 69 | 56 | 43 | 36 | 28 | 23 |
| | Dilution to Equal Extent with Water. | 110 | 110 | 110 | 109 | 108 | 107 | 104 | 96 |

[1] Settling out of weighting agent during testing was observed.

It will be noted that treatment of the 1.75% clay content mud with sufficient sodium hexametaphosphate to reduce the viscosity of the mud to 83 centipoises reduced the gel strength of the mud so far that the weighting agent settled out. As a matter of fact, the viscosity of this mud could not be reduced to less than about 91 centipoises without also reducing the gel strength to a point at which settling of the weighting agent began to occur. On the other hand, the sodium salts of mixed aromatic acids from the oxidation of bituminous coal reduced the viscosity of this mud to 113 centipoises while reducing its extrapolated yield value to only 83 grams Stormer with no tendency of heavy weighting material to settle being noted.

These data further show that in the case of the mud containing 1.25% of clay, the viscosity was reduced by the sodium salts of mixed aromatic acids to 48 centipoises and the extrapolated yield value was reduced to 23 grams Stormer with no settling of weighting agent. The viscosity of this same mud was reduced by sodium hexametaphosphate to 54 centipoise mud with no settling of the weighting agent, but with the addition of larger amounts of sodium hexametaphosphate, the extrapolated yield value of the mud dropped The effect of adding sodium hexametaphosphate and the sodium salts of mixed aromatic acids to the mud containing 1.44% clay are interminate the effects obtained when these agents are added to the mud containing 1.75% clay and the mud containing 1.25% clay.

Tables IV and V make it apparent that rather than attempting to reduce the viscosity of the mud containing 1.75% clay to a desirably low value, while still retaining the suspending properties of the mud, by adding a conventional viscosity reducing agent, such as sodium hexametaphosphate, a mud of desirable viscosity and gel strength characteristics could better have been obtained by removing from the mud a portion of the clay and then adding an agent capable of selectively treating the heavy weighting agent and coarser components of the mud.

It will be understood, of course, that sodium salts of mixed aromatic acids from oxidation of bituminous coal have been used in the foregoing examples for the purpose of illustration and not by way of limitation. On the contrary, any material capable of selectively treating the weighting agent and coarser components of the mud may be employed.

Having fully described my invention, what I wish to claim and to secure by Letters Patent is:

1. A process of controlling the viscosity and gel strength of an aqueous drilling fluid containing clay and weighting material which comprises adjusting the clay content of the fluid to a value sufficient to maintain the weighting material in suspension in the fluid of adjusted clay content and adding to the fluid of adjusted clay content a viscosity reducing quantity of an alkali metal salt of a material selected from the group consisting of carboxylated benzene and alkyl substituted carboxylated benzene in which the benzene nuclei of said material contains at least 3 carbon atoms to which carboxyl groups are attached.

2. A process in accordance with claim 1 in which the alkali metal salt is added in an amount in the range of 0.001 to 0.2 weight per cent of the drilling fluid.

3. A process for reducing the viscosity of an aqueous drilling fluid containing clay and weighting material which comprises removing a portion of the clay from the drilling fluid to form a drilling fluid of reduced clay content and adding to the drilling fluid of reduced clay content a viscosity reducing amount of an alkali metal salt of a material selected from the group consisting of carboxylated benzene and alkyl substituted carboxylated benzene in which the benzene nuclei of said material contains at least 3 carbon atoms to which carboxyl groups are attached.

4. A process in accordance with claim 3 in which the alkali metal salt is added in an amount in the range of 0.001 to 0.2 weight per cent of the drilling fluid.

5. A process for controlling the viscosity of an aqueous drilling fluid containing clay and weighting material which comprises reducing the clay content of the drilling fluid to a value no less than that required to maintain the weighting agent in suspension and adding to the drilling fluid of reduced clay content a viscosity reducing amount of an alkali metal salt of a material selected from the group consisting of carboxylated benzene and alkyl substituted carboxylated benzene in which the benzene nuclei of said material contains at least 3 carbon atoms to which carboxyl groups are attached.

6. A process in accordance with claim 5 in which the alkali metal salt is added in an amount in the range of 0.001 to 0.2 weight per cent of the drilling fluid.

RICHARD A. SALATHIEL.

REFERENCES CITED

The following references are of record in the file of this patent:

UNITED STATES PATENTS

| Number | Name | Date |
| --- | --- | --- |
| 2,295,067 | Williams | Sept. 8, 1942 |
| 2,331,280 | Wayne | Oct. 12, 1943 |

OTHER REFERENCES

Pages 7 and 8 of "Petroleum," Zeitschrift issue No. 44 of November 2, 1932. Article on the treatment, with a view to reduction of viscosity, of the mud fluids used in drilling operations. (A report from the laboratory of the N. V. De Bataafsche Petroleum Maatschappij.)